(12) United States Patent
Mishra et al.

(10) Patent No.: US 9,188,736 B2
(45) Date of Patent: Nov. 17, 2015

(54) LOW BEND LOSS OPTICAL FIBER

(71) Applicant: CORNING INCORPORATED, Corning, NY (US)

(72) Inventors: Snigdharaj Kumar Mishra, Wilmington, NC (US); Pushkar Tandon, Painted Post, NY (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 14/211,035

(22) Filed: Mar. 14, 2014

(65) Prior Publication Data

US 2014/0301708 A1 Oct. 9, 2014

Related U.S. Application Data

(60) Provisional application No. 61/809,537, filed on Apr. 8, 2013.

(51) Int. Cl.
*G02B 6/02* (2006.01)
*G02B 6/028* (2006.01)
*G02B 6/036* (2006.01)

(52) U.S. Cl.
CPC .............. *G02B 6/02* (2013.01); *G02B 6/0281* (2013.01); *G02B 6/03627* (2013.01)

(58) Field of Classification Search
CPC ..... G02B 6/03627; G02B 6/02; G02B 6/0281
USPC .......................................... 385/124, 126, 127
See application file for complete search history.

(56) References Cited

U.S. PATENT DOCUMENTS

| | | | |
|---|---|---|---|
| 4,230,396 A * | 10/1980 | Olshansky et al. ............ | 385/124 |
| 4,447,127 A * | 5/1984 | Cohen et al. ................... | 385/127 |
| 4,641,917 A | 2/1987 | Glodis et al. | |
| 4,852,968 A | 8/1989 | Reed | |
| 5,056,888 A | 10/1991 | Messerly et al. | |
| 5,721,800 A | 2/1998 | Kato et al. | |
| 6,009,221 A | 12/1999 | Tsuda | |
| 6,084,993 A | 7/2000 | Mukasa | |
| 6,116,055 A | 9/2000 | Ishikawa et al. | |
| 6,175,680 B1 | 1/2001 | Arai et al. | |
| 6,233,001 B1 | 5/2001 | Sasaki | |

(Continued)

FOREIGN PATENT DOCUMENTS

| | | |
|---|---|---|
| EP | 1116969 | 7/2001 |
| EP | 2175295 | 4/2010 |

(Continued)

OTHER PUBLICATIONS

PCT/US14/032939 Search Report.

*Primary Examiner* — Peter Radkowski
(74) *Attorney, Agent, or Firm* — Robert L. Carlson

(57) ABSTRACT

An optical fiber having both low bend loss. The fiber has a central core region having refractive index $\Delta_1$, an inner cladding region having an outer radius $r_2 > 17$ microns and refractive index $\Delta_2$ and a second cladding region surrounding the inner cladding region having refractive index $\Delta_3$. The fiber profile segments may be arranged so that $\Delta_1 > \Delta_3 > \Delta_2$. The fiber may exhibit a profile volume, $V_2$ of the inner cladding region, calculated between $r_1$ and $r_2$, is at least 30% $\Delta$micron$^2$.

19 Claims, 1 Drawing Sheet

(56) References Cited

U.S. PATENT DOCUMENTS

| | | |
|---|---|---|
| 6,363,196 B1 | 3/2002 | Rousseau et al. |
| 6,625,362 B2 | 9/2003 | Inagaki et al. |
| 6,798,962 B2 | 9/2004 | Berkey et al. |
| 6,823,125 B2 | 11/2004 | Koumura et al. |
| 6,842,566 B2 | 1/2005 | Ishikawa et al. |
| 6,859,599 B2 * | 2/2005 | Mukasa .................. 385/127 |
| 6,901,196 B2 | 5/2005 | Takahashi et al. |
| 6,904,218 B2 | 6/2005 | Sun et al. |
| 6,999,667 B2 | 2/2006 | Jang et al. |
| 7,043,125 B2 | 5/2006 | Diep et al. |
| 7,164,835 B2 | 1/2007 | Matsuo et al. |
| 7,171,090 B2 | 1/2007 | Mattingly et al. |
| 7,187,833 B2 | 3/2007 | Mishra |
| 7,203,397 B2 | 4/2007 | Ouchi et al. |
| 7,239,784 B2 | 7/2007 | Hayami et al. |
| 7,274,848 B1 * | 9/2007 | Mishra .................. 385/127 |
| 7,366,387 B2 | 4/2008 | Matsuo et al. |
| 7,406,237 B2 | 7/2008 | Bickham et al. |
| 7,440,663 B2 | 10/2008 | Matsuo et al. |
| 7,450,807 B2 * | 11/2008 | Bickham et al. ......... 385/126 |
| 7,505,657 B2 | 3/2009 | Matsuo et al. |
| 7,526,168 B2 | 4/2009 | Matsuo et al. |
| 7,526,169 B2 | 4/2009 | Bickham et al. |
| 7,876,990 B1 | 1/2011 | Mishra |
| 7,924,500 B1 * | 4/2011 | Minelly .................. 359/341.1 |
| 2002/0003923 A1 * | 1/2002 | Ranka et al. ............ 385/28 |
| 2002/0186941 A1 | 12/2002 | Hsu et al. |
| 2003/0016927 A1 | 1/2003 | Soufiane et al. |
| 2003/0161600 A1 * | 8/2003 | Mukasa .................. 385/127 |
| 2003/0190127 A1 | 10/2003 | Sillard et al. |
| 2003/0210878 A1 | 11/2003 | Kumano et al. |
| 2003/0223716 A1 | 12/2003 | Christoff et al. |
| 2004/0114892 A1 | 6/2004 | Chiang et al. |
| 2005/0175303 A1 | 8/2005 | Jang et al. |
| 2005/0180709 A1 | 8/2005 | Park et al. |
| 2005/0185906 A1 | 8/2005 | Bickham et al. |
| 2006/0115224 A1 | 6/2006 | Kutami et al. |
| 2007/0189684 A1 | 8/2007 | Matsuo et al. |
| 2007/0189699 A1 | 8/2007 | Matsuo et al. |
| 2008/0056658 A1 * | 3/2008 | Bickham et al. ......... 385/127 |
| 2008/0101755 A1 | 5/2008 | Matsuo et al. |
| 2008/0273850 A1 | 11/2008 | Imamura |
| 2011/0142404 A1 | 6/2011 | Zhang et al. |
| 2011/0211796 A1 * | 9/2011 | Bookbinder et al. ..... 385/126 |
| 2013/0044987 A1 | 2/2013 | Bickham et al. |

FOREIGN PATENT DOCUMENTS

| | | |
|---|---|---|
| JP | 2007/108764 | 4/2007 |
| WO | 83/01517 | 4/1983 |
| WO | 02/21731 | 3/2002 |
| WO | 2009/104724 | 8/2009 |
| WO | 2011/031612 | 3/2011 |
| WO | 2011/147272 | 12/2011 |
| WO | 2012/121923 | 9/2012 |

\* cited by examiner

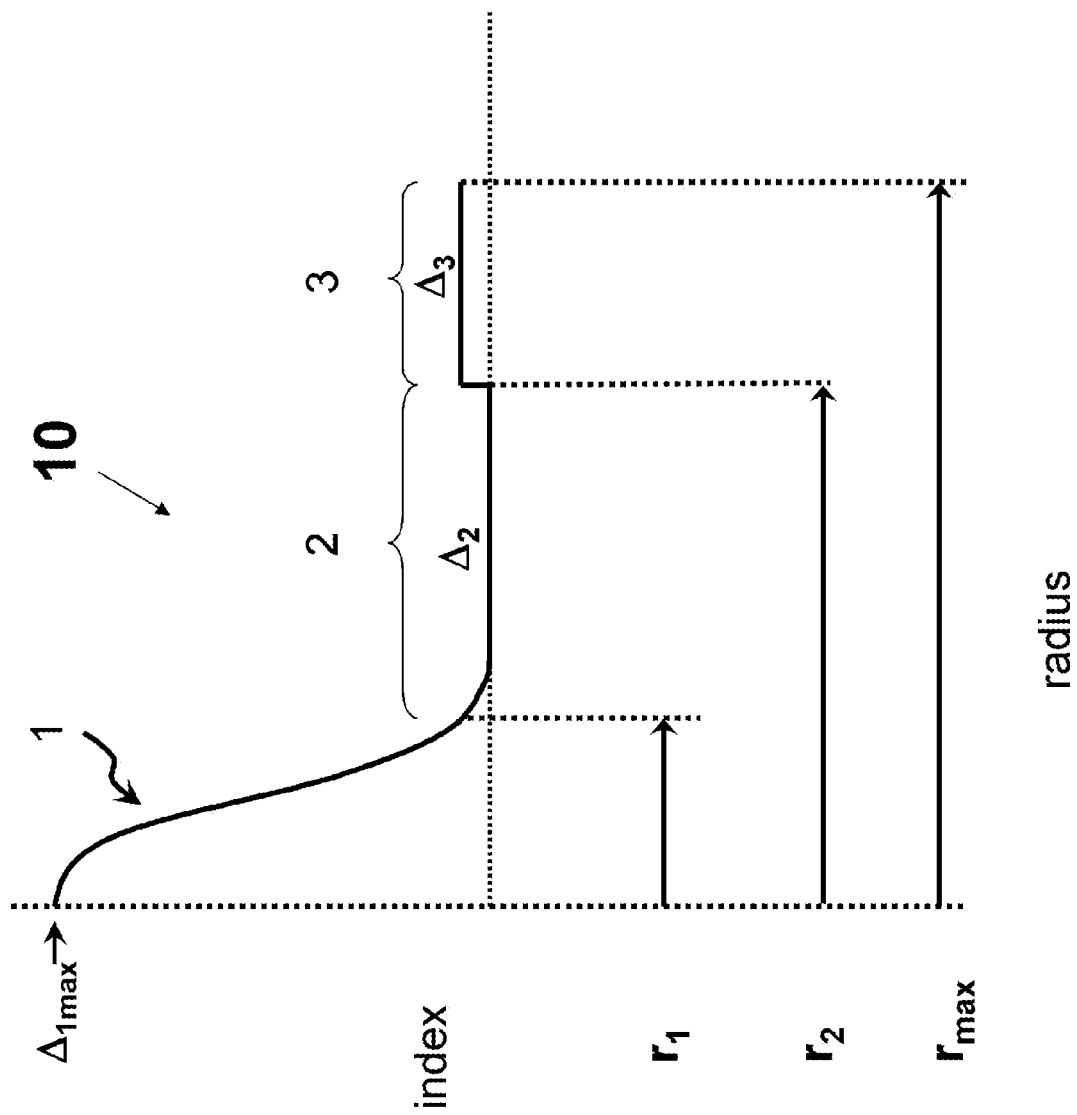

US 9,188,736 B2

LOW BEND LOSS OPTICAL FIBER

CROSS REFERENCE TO RELATED APPLICATIONS

This application claims the benefit of priority under 35 U.S.C. §119 of U.S. Provisional Application Ser. No. 61/809,537 filed on Apr. 8, 2013 the contents of which are relied upon and incorporated herein by reference in their entirety as if fully set forth below.

FIELD

The present invention relates to optical fibers having low bend losses.

TECHNICAL BACKGROUND

There is a need for low bend loss optical fibers, particularly for optical fibers utilized in so-called "access" and fiber to the premises (FTTx) optical networks. Optical fiber can be deployed in such networks in a manner which induces bend losses in optical signals transmitted through the optical fiber. Some applications that can impose physical demands, such as tight bend radii, compression of optical fiber, etc., that induce bend losses include the deployment of optical fiber in optical drop cable assemblies, distribution cables with Factory Installed Termination Systems (FITS) and slack loops, small bend radius multiports located in cabinets that connect feeder and distribution cables, and jumpers in Network Access Points between distribution and drop cables. It has been difficult in some optical fiber designs to achieve both low bend loss and low cable cutoff wavelength at the same time.

SUMMARY

Disclosed herein are optical waveguide fibers comprising a central core region having outer radius $r_1$, and refractive index $\Delta_1$, a cladding region comprising a first inner cladding region having an outer radius $r_2 > 17$ microns and refractive index $\Delta_2$ and a second cladding region surrounding the inner cladding region and comprising refractive index $\Delta_3$, wherein $\Delta_3$ is greater than 0.0% $\Delta$, $\Delta_1 > \Delta_3 > \Delta_2$. The difference between $\Delta_3$ and $\Delta_2$ is preferably greater than 0.02% $\Delta$. The fiber may exhibit a profile volume, $V_2$ of the inner cladding region, calculated between $r_1$ and $r_2$, which is equal to:

$$V_2 = 2 \int_{r1}^{r2} \Delta_{(3-2)}(r) r \, dr$$

and $|V_2|$ is at least 30% $\Delta$micron$^2$.

Also disclosed herein are optical waveguide fibers comprising a central core region having outer radius $r_1$, refractive index $\Delta_1$ and core alpha greater than 10, a cladding region comprising a first inner cladding region having an outer radius $r_2 > 14$ microns and refractive index $\Delta_2$ and a second cladding region surrounding the inner cladding region and comprising refractive index $\Delta_3$, wherein $\Delta_3$ is greater than 0.0%, $\Delta_1 > \Delta_3 > \Delta_2$. The difference between $\Delta_3$ and $\Delta_2$ is preferably greater than 0.02%, the fiber exhibits a profile volume, $V_2$ of the inner cladding region, calculated between $r_1$ and $r_2$, which is equal to:

$$V_2 = 2 \int_{r1}^{r2} \Delta_{(3-2)}(r) r \, dr$$

and $|V_2|$ is at least 5% $\Delta$micron$^2$.

The fibers disclosed herein may exhibit a MAC number less than 7.5 and preferably exhibit a 22 m cable cutoff less than or equal to 1260 nm. The ratio of $r_1/r_2$ may be less than 0.4, more preferably less than 0.35, and even more preferably less than 0.3. In some embodiments the difference between $\Delta_3$ and $\Delta_2$ is greater than 0.02% $\Delta$ and in some embodiments the difference between $\Delta_3$ and $\Delta_2$ is greater than 0.05% $\Delta$. In some embodiments, the difference between $\Delta_3$ and $\Delta_2$ is between 0.03% $\Delta$ and 0.17% $\Delta$. In the fibers disclosed herein, $\Delta_3$ is preferably greater than 0.0, more preferably greater than 0.02% $\Delta$ and more preferably greater than 0.04% $\Delta$.

The fiber designs disclosed herein result in fibers having optical properties that are G.652 compliant, having a mode field diameter between 8.2 and 9.1 microns at 1310 nm, more preferably between 8.3 and 8.9 microns at 1310 nm, zero dispersion wavelength, $\lambda_0$, of $1300 \le \lambda 0 \le 1324$ nm, cable cutoff less than or equal to 1260 nm, and attenuation at 1550 nm $\le 0.195$ dB/Km, more preferably $\le 0.185$ dB/Km, even more preferably $\le 0.183$ dB/Km at 1550 nm. The index profile in the core region is a graded index profile and is characterized by an core alpha parameter, $\alpha$. The core alpha parameter is preferably less than 10, more preferably less than 5, and even more preferably less than 3. The core alpha parameter is preferably larger than 1, more preferably larger than 1.3 and even more preferably larger than 1.5. In some embodiments, the core may comprise a refractive index profile which at least substantially follows a super-Gaussian profile, i.e. a profile which at least substantially follows the equation % $\Delta$ (r)=% $\Delta_{1max} \cdot \text{EXP}(-((r/a)^\gamma))$, where r is the radial distance from center of the fiber, a is a radial scaling parameter corresponding to the radial location at which % $\Delta = ((\% \Delta_{1max}/e)$, e is the base of the natural logarithm (~2.71828 . . . ), and $\gamma$ (gamma) is a positive number. Preferably, a is greater than 4.0 microns, more preferably greater than 4.6 microns, and most preferably greater than 4.7 microns.

The cladding region comprises an inner region surrounding the core having an index that is depressed compared to the outer cladding region. Preferably, this depressed region is formed by increasing the refractive index of the outer cladding. In this way, down dopants such as fluorine can be avoided in the depressed cladding region. Fibers having this depressed cladding region have reduced macrobending and microbending losses. The depressed index cladding region may have an index with respect to the outer cladding which is between −0.02 and −0.15% $\Delta$, with the absolute volume of the depressed index cladding region being of greater than 30% $\Delta$ microns. The depressed index inner cladding region is preferably immediately adjacent to the core region, and may be formed either by down doping the trench region (e.g. by fluorine doping or by doping with non-periodic voids) or by updoping the outer cladding. In other embodiments, the fibers may include both a depressed index inner cladding region and an outer cladding region which is updoped with respect to silica, i.e. a cladding region which includes an index increasing dopant such as germania or chlorine in sufficient amounts to appreciably raise the index of silica.

The fibers including super Gaussian profiles result in lower attenuation by 0.001 to 0.005 dB/km compared to comparable step index core profile germania-doped single mode (at 1550 nm) products. Lower attenuation will enable these fibers to reduce signal to noise ratio in the network. The super Gaussian profiles also result in lower macro- and microbending losses. Additional embodiments with a depressed cladding region allow new fiber designs with more control of dispersion properties.

In some embodiments, the fiber has a core alpha of larger than 10, inner clad radius $r_2$ of larger than 14 microns and has moat volume $|V_2|$ of at least 5% $\Delta$micron$^2$. Preferably, the fibers disclosed herein are capable of exhibiting a wire mesh covered drum microbend loss (i.e., an increase in attenuation from the unbent state) at 1550 nm which is less than or equal to 0.07 dB/km, more preferably less than or equal to 0.05 dB/km. Additionally, the fibers disclosed herein are capable of exhibiting a 20 mm diameter bend loss at 1550 nm which is not more than 0.08 dB/turn and 20 mm diameter bend loss at 1625 nm which is not more than 0.2 dB/turn, and a 15 mm diameter bend loss at 1550 nm which is not more than 0.4 dB/turn. Additionally, the fibers disclosed herein are capable of exhibiting a microbend loss, as measured by wire mesh drum test, of less than 0.1 dB/km, more preferably less than 0.05 dB/km.

At the same time, these fibers are capable of providing an attenuation at 1550 nm which is less than or equal to 0.195 dB/km, more preferably less than 0.19 dB/km, and most preferably less than 0.185 dB/km, as well as an attenuation at 1310 nm which is less than or equal to 0.34 dB/km, more preferably less than 0.32 dB/km. The fiber may be coated with a primary and secondary coating applied to the fiber, wherein the Young's modulus of the primary coating is less than 5 MPa, more preferably less than 1 MPa, and the Young's modulus of the secondary coating is greater than 500 MPa, more preferably greater than 900 MPa, and even more preferably greater than 1100 MPa.

As used herein, MAC number means mode field diameter (in nm) at wavelength of 1310 nm divided by 22 m cable cutoff wavelength (in nm). The fibers disclosed herein preferably exhibit a MAC number of less than 7.5.

Reference will now be made in detail to the present preferred embodiments, examples of which are illustrated in the accompanying drawings.

BRIEF DESCRIPTION OF THE DRAWINGS

FIG. 1 shows a refractive index profile corresponding to an embodiment of an optical waveguide fiber as disclosed herein.

DETAILED DESCRIPTION OF THE PREFERRED EMBODIMENT

Additional features and advantages will be set forth in the detailed description which follows and will be apparent to those skilled in the art from the description or recognized by practicing as described in the following description together with the claims and appended drawings.

The "refractive index profile" is the relationship between refractive index or relative refractive index and waveguide fiber radius. The radius for each segment of the refractive index profile is given by the abbreviations $r_1$, $r_2$, $r_3$, etc. and lower an upper case are used interchangeability herein (e.g., $r_1$ is equivalent to $R_1$).

The "relative refractive index percent" is defined as $\Delta\% = 100 \times (n_i^2 - n_c^2)/2n_i^2$, and as used herein $n_c$ is the average refractive index of undoped silica. As used herein, the relative refractive index is represented by $\Delta$ and its values are given in units of "%", unless otherwise specified. The terms: delta, $\Delta$, $\Delta\%$, % $\Delta$, delta %, % delta and percent delta may be used interchangeably herein. An "updopant" is herein considered to be a dopant which has a propensity to raise the refractive index relative to pure undoped $SiO_2$. A "downdopant" is herein considered to be a dopant which has a propensity to lower the refractive index relative to pure undoped $SiO_2$. Examples of updopants include $GeO_2$ (germania), $Al_2O_3$, $P_2O_5$, $TiO_2$, Cl, Br. Examples of down dopants include fluorine and boron.

"Chromatic dispersion", herein referred to as "dispersion" unless otherwise noted, of a waveguide fiber is the sum of the material dispersion, the waveguide dispersion, and the inter-modal dispersion. In the case of single mode waveguide fibers the inter-modal dispersion is zero. Zero dispersion wavelength is a wavelength at which the dispersion has a value of zero. Dispersion slope is the rate of change of dispersion with respect to wavelength.

"Effective area" is defined as:

$$A_{eff} = 2\pi(\int f^2 r dr)^2 / (\int f^4 r dr),$$

where the integration limits are 0 to $\infty$, and f is the transverse component of the electric field associated with light propagated in the waveguide. As used herein, "effective area" or "$A_{eff}$" refers to optical effective area at a wavelength of 1550 nm unless otherwise noted.

The term "$\alpha$-profile" refers to a relative refractive index profile, expressed in terms of $\Delta(r)$ which is in units of "%", where r is radius, which follows the equation, $$\Delta(r) = \Delta(r_o)(1 - [|r - r_o|/(r_1 - r_o)]^\alpha),$$

where $r_o$ is the point at which $\Delta(r)$ is maximum, $r_1$ is the point at which $\Delta(r)\%$ is zero, and r is in the range $r_i \leq r \leq r_f$, where $\Delta$ is defined above, $r_i$ is the initial point of the $\alpha$-profile, $r_f$ is the final point of the $\alpha$-profile, and $\alpha$ is an exponent which is a real number.

The mode field diameter (MFD) is measured using the Peterman II method wherein, 2 w=MFD, and $w^2 = (2\int f^2 r dr / \int [df/dr]^2 r dr)$, the integral limits being 0 to $\infty$.

The bend resistance of a waveguide fiber can be gauged by induced attenuation under prescribed test conditions, for example by deploying or wrapping the fiber around a mandrel of a prescribed diameter, e.g., by wrapping 1 turn around a either a 6 mm, 10 mm, or 20 mm or similar diameter mandrel (e.g. "1×10 mm diameter macrobend loss" or the "1×20 mm diameter macrobend loss") and measuring the increase in attenuation per turn.

Another type of bend test is the wire mesh covered drum microbend test (WMCD). In this test, a 400 mm diameter aluminum drum is wrapped with wire mesh. The mesh is wrapped tightly without stretching, and should have no holes, dips, or damage. Wire mesh material specification: McMaster-Carr Supply Company (Cleveland, Ohio), part number 85385T106, corrosion-resistant type 304 stainless steel woven wire cloth, mesh per linear inch: 165×165, wire diameter: 0.0019", width opening: 0.0041", open area %: 44.0. A prescribed length (750 meters) of waveguide fiber is wound at 1 m/s on the wire mesh drum at 0.050 centimeter take-up pitch while applying 80 (+/−1) grams tension. The ends of the prescribed length of fiber are taped to maintain tension and there are no fiber crossovers. The attenuation of the optical fiber is measured at a specified wavelength (typically within the range of 1200-1700 nm, e.g., 1310 nm or 1550 nm or 1625 nm); a reference attenuation is measured on the optical fiber wound on a smooth drum. The increase in attenuation is the wire mesh covered drum attenuation of the waveguide in dB/km at a specified wavelength (typically within the range of 1200-1700 nm, e.g., 1310 nm or 1550 nm or 1625 nm).

By cabled cutoff wavelength, or "cabled cutoff" as used herein, we mean the 22 m cabled cutoff test described in the EIA-445 Fiber Optic Test Procedures, which are part of the EIA-TIA Fiber Optics Standards, that is, the Electronics Industry Alliance-Telecommunications Industry Association Fiber Optics Standards.

Unless otherwise noted herein, optical properties (such as dispersion, dispersion slope, etc.) are reported for the LP01 mode.

Optical fibers disclosed herein are capable of exhibiting an effective area at 1550 nm which is greater than about 55 microns$^2$, preferably between 55 and 85 microns$^2$, even more preferably between about 65 and 80 microns$^2$. In some preferred embodiments, the optical mode effective area at 1550 nm is between about 70 and 80 micron.

One exemplary fiber 10 is shown in FIG. 1, includes a central glass core region 1 comprising a graded index profile with core alpha parameter α and maximum refractive index delta percent $\Delta_1$. A first depressed inner cladding region 2 surrounds central core region 1, the first inner cladding region 2 comprising refractive index delta percent $\Delta_2$. Outer cladding region 3 surrounds first inner cladding region 2 and comprises $\Delta_3$. In preferred embodiments, $\Delta_1 > \Delta_3 > \Delta_2$. In the embodiment illustrated in FIG. 1, regions 1, 2, 3 are immediately adjacent to one another.

Central core region 1 comprises an outer radius $r_1$ which is defined as where a tangent line drawn through maximum slope of the refractive index of central core region 1 crosses the zero delta line. Core region 1 preferably exhibits a refractive index delta percent, $\Delta_1$, between about 0.3 to 0.7% $\Delta$, and in some embodiments between about 0.3 to 0.55% $\Delta$, more preferably between about 0.32 to 0.52% $\Delta$. Core radius $r_1$ is preferably between 3 and 10 microns, more preferably between about 4.0 to 7.0 microns. Central core region 1 exhibits an alpha greater than 0.5 and less than 16, and in some embodiments less than 10, less than 5, or less than 3.

In the embodiment illustrated in FIG. 1, inner depressed cladding region 2 surrounds central core region 1 and comprises inner radius $r_1$ and outer radius $r_2$, $r_2$ being defined as where the refractive index profile curve increases to form region 3. In some cases the refractive index in region 2 is essentially flat, in some embodiments refractive index in region 2 increases in refractive index as radius increases. Still in other cases there can be fluctuations as a result of small profile design or process variations. In some embodiments, the first inner cladding region contains less than 0.02 wt % fluorine. The inner cladding region 2 preferably comprises silica which is substantially undoped with either fluorine, boron, or germania, i.e., such that the region is essentially free of fluorine, boron, and germania.

The inner cladding region 2 is depressed with respect to outer cladding region 3 and, preferably exhibits a width between about 9 to 25 microns, more preferably 10 to 20 microns, even more preferably between about 11 to 15 microns. In some embodiments, $R_2$ may be greater than 14, greater than 17, greater than 19 microns, or greater than 21 microns and less than 30 microns, more preferably less than 25 microns. In some embodiments, the ratio of the core radius $r_1$ over the inner cladding region 2 radius $r_2$ is less than 0.4, more preferably less than 0.35 and even more preferably less than 0.3.

Outer cladding region 3 surrounds the depressed annular region 3 and comprises refractive index delta percent $\Delta_3$ which is higher than the index $\Delta_2$ of inner cladding region 2, thereby forming a region which is an "updoped" outer cladding region 3 with respect to inner cladding region 2, e.g. by adding an amount of dopant (such as germania or chlorine) sufficient to increase the refractive index of the outer cladding region. Note, however, that it is not critical that region 3 be updoped in the sense that an index increasing dopant must be included in region 3. Indeed, the same sort of raised index effect in outer cladding region 3 may be achieved by downdoping inner cladding region 2 with respect to outer cladding region 3. However, in some embodiments, there is no fluorine or other down dopants in inner cladding region 2, and region 3 comprises an updopant, for example chlorine. Outer cladding region 3 comprises a higher refractive index than inner cladding region 2, and preferably comprises refractive index delta percent $\Delta_3$ which is greater than 0.02% $\Delta$, preferably at least 0.05% $\Delta$, for example at least 0.08% $\Delta$, and may be greater than 0.1 or 0.12 percent delta. Preferably, the higher index portion (compared to inner cladding region 2) of outer cladding region 3 extends at least to the point where the optical power which would be transmitted through the optical fiber is greater than or equal to 90% of the optical power transmitted, more preferably to the point where the optical power which would be transmitted through the optical fiber is greater than or equal to 95% of the optical power transmitted, and most preferably to the point where the optical power which would be transmitted through the optical fiber is greater than or equal to 98% of the optical power transmitted. In many embodiments, this is achieved by having the "updoped" third annular region extend at least to a radial point of about 30 microns. Consequently, the volume of $V_2$ is defined herein being calculated using $\Delta(3-2)(r)rdr$ between radius $r_1$ and $r_2$, and thus is defined as $$V_2 = 2\int_{r_1}^{r_2} \Delta_{(3-2)}(r)r\,dr$$

All volumes are in absolute magnitude (i.e., $V_2=|_2|$). The volume $V_2$ of the inner cladding region compared to that of the outer cladding region 3, is preferably greater than 30% $\Delta$micron$^2$, and in some embodiments may be greater than 40, 50, and even 55% $\Delta$micron$^2$.

In some embodiments, the refractive index $\Delta_3$ of the outer cladding region is greater than 0.02% $\Delta$, in some embodiments greater than 0.03% $\Delta$, in some embodiments at least 0.05% $\Delta$, and in some embodiments at least 0.08% $\Delta$ and more preferably greater than 0.1% $\Delta$, when compared to that of the inner cladding region 2. In some embodiments, the third annular region comprises chlorine (Cl) in an amount greater than 200 ppm when compared to that of the inner cladding region 2, for example greater than 400 or 700 or 1000 ppm or more, and in some embodiments preferably greater than 1500 ppm, and, in some embodiments, most preferably greater than 2000 ppm (0.2%) by weight (e.g., 2200 ppm, 2500 ppm, 3000 ppm, 4000 ppm, 5000 ppm, 6000 ppm, 10000 ppm, or there between). Chlorine concentration is described herein in units of parts per million by weight (abbreviated as ppm wt. or ppm, herein).

The inner cladding region 2 preferably has a substantially constant relative refractive index profile, i.e. the difference between the relative refractive index at any two radii within the intermediate region is less than 0.02%, and in some preferred embodiments less than 0.01%. Thus, the relative refractive index profile of the inner cladding region 20 preferably has a substantially flat shape.

In preferred embodiments, the core region 1 has an index profile comprising an alpha (α) shape, with the core alpha parameter ranging between 1 and 5, and more preferably between 1.5 and 3. In preferred embodiments, $R_1$ is less than 8.0 microns, and more preferably is between 4.0 microns and 7.0 microns. In these embodiments, the trench volume $V_2$ is larger than 30% Δmicron^2. The fibers are capable of exhibiting a bend loss of less than 0.08 dB/turn when wound upon on a 20 mm radius mandrel for fibers with MAC numbers less than 7.5. The fibers are capable of exhibiting a bend loss of less than 0.4 dB/turn when wound upon on a 15 mm radius mandrel for fibers with MAC numbers less than 7.5.

In some other embodiments, the core has a core alpha parameter larger than 10 and a trench volume V2 of larger than 5% Δmicron^2.

Various exemplary embodiments will be further clarified by the following examples. It will be apparent to those skilled in the art that various modifications and variations can be made without departing from the spirit or scope of the claims.

Table 1 below list characteristics of modeled illustrative examples 1-9 having a refractive index as shown in FIG. 1. In particular, set forth below for each example is the refractive index delta $\Delta_1$, core alpha, and outer radius $R_1$ of the central core region 1, refractive index delta $\Delta_2$ and outer radius $R_2$ inner cladding region 2 and profile volume $V_2$ of the inner cladding region 2, which is calculated between $R_1$ and $R_2$, refractive index delta $\Delta_3$ of the outer cladding region 3. Also set forth is refractive index delta $\Delta_3$ of the outer cladding region 3, outer diameter of the glass optical fiber $R_{max}$, and profile volume $V_3$ of the outer cladding region 3, which is calculated between $R_2$ and a radial distance of 30 microns and also between refractive index delta $\Delta_3$ and the index of undoped silica. Also set forth are zero dispersion and dispersion slope at 1310 nm, chromatic dispersion and dispersion slope at 1550 nm, mode field diameter at 1310 nm and 1550 nm, 22 m cable cutoff, MAC number at 1310 nm, 1×10 mm diameter bend loss at 1550 nm, 1×20 mm diameter bend loss at 1550 nm, 1×15 mm diameter bend loss at 1550 nm, 1×30 mm diameter bend loss at 1550 nm, and attenuation at 1310 and 1550 nm, and microbending loss as measured by the wire mesh drum test.

TABLE 1

| Parameter | Example 1 | Example 2 | Example 3 | Example 4 | Example 5 | Example 6 | Example 7 | Example 8 | Example 9 |
|---|---|---|---|---|---|---|---|---|---|
| $\Delta_{1max}$ (%) | 0.51 | 0.38 | 0.46 | 0.52 | 0.46 | 0.51 | 0.51 | 0.485 | 0.46 |
| $R_1$ (micron) | 5.98 | 5.17 | 6.13 | 5.36 | 5.18 | 6.06 | 6.11 | 6.24 | 6.13 |
| Core Alpha | 1.6 | 4 | 1.8 | 15 | 15 | 2 | 2 | 2 | 1.8 |
| $R_2$ (micron) | 17.525 | 20.01 | 17.432 | 14.43 | 14.51 | 20.2 | 18.1 | 20.8 | 17.5 |
| $R_1/R_2$ | 0.34 | 0.26 | 0.35 | 0.37 | 0.36 | 0.30 | 0.33 | 0.30 | 0.35 |
| $\Delta_2$ (%) | 0 | 0 | 0 | 0 | 0 | 0 | 0 | 0 | 0 |
| $R_3$ (micron) | 62.5 | 62.5 | 62.5 | 62.5 | 62.5 | 62.5 | 62.5 | 62.5 | 62.5 |
| $V_2$ (% micron$^2$) | 27.14 | 11.21 | 26.63 | 14.36 | 5.51 | 36.80 | 31.00 | 39.77 | 40.30 |
| $\Delta_3$ (%) | 0.10 | 0.03 | 0.10 | 0.08 | 0.03 | 0.10 | 0.10 | 0.10 | 0.15 |
| $V_3$ (% micron$^2$, in absolute magnitude, from R2 to 30 microns) | 59.29 | 14.99 | 59.61 | 55.34 | 20.68 | 49.10 | 57.20 | 46.70 | 89.06 |
| $R_{max}$ (micron) | 62.5 | 62.5 | 62.5 | 62.5 | 62.5 | 62.5 | 62.5 | 62.5 | 62.5 |
| MAC # | 7.08 | 7.33 | 7.49 | 6.54 | 6.75 | 7.02 | 7.07 | 7.22 | 7.60 |
| Cable Cutoff (nm) | 1215 | 1215 | 1215 | 1290 | 1265 | 1224 | 1217 | 1222 | 1200 |
| Zero Dispersion Wavelength | 1317 | 1312 | 1312 | 1295 | 1304 | 1314 | 1313 | 1312 | 1313 |
| Dispersion Slope 1310 nm (ps/nm$^2$/km) | 0.0898 | 0.0873 | 0.081 | 0.091 | 0.088 | 0.09 | 0.09 | 0.09 | 0.081 |
| Dispersion 1550 nm (ps/nm/km) | 17.52 | 16.898 | 17.713 | 17.86 | 19.29 | 17.85 | 17.94 | 18.11 | 18.713 |
| Dispersion Slope 1550 nm (ps/nm$^2$/km) | 0.058 | 0.059 | 0.057 | 0.061 | 0.06 | 0.06 | 0.06 | 0.06 | 0.057 |
| Attenuation at 1550 nm (dB/km) | 0.189 | 0.188 | 0.186 | 0.197 | 0.194 | 0.189 | 0.189 | 0.188 | 0.186 |
| MFD 1310 nm (micron) | 8.60 | 8.90 | 9.10 | 8.44 | 8.53 | 8.59 | 8.61 | 8.82 | 9.12 |
| MFD 1550 nm (micron) | 9.63 | 9.97 | 10.22 | 9.45 | 9.56 | 9.63 | 9.65 | 9.88 | 10.23 |
| Aeff at 1550 nm (microns$^2$) | 70.31 | 72.77 | 78.73 | 69.01 | 69.77 | 70.38 | 70.71 | 74.20 | 78.95 |
| Bend Loss 10 mm Dia (dB/turn) | 0.0945 | 0.225 | 0.63 | 0.405 | 0.891 | 0.68 | 0.99 | 0.84 | 0.54 |
| Bend Loss 15 mm Dia. (dB/turn) | 0.0210 | 0.0500 | 0.1400 | 0.0900 | 0.1980 | 0.1500 | 0.2200 | 0.1900 | 0.1200 |
| Bend Loss 20 mm Dia. (dB/turn) | 0.0020 | 0.0050 | 0.0100 | 0.0010 | 0.0060 | 0.0330 | 0.0470 | 0.0450 | 0.0080 |
| Bend Loss 30 mm (dB/turn) | 0.001 | 0.005 | 0.007 | 0.0000 | 0.0000 | 0.0019 | 0.0021 | 0.003 | 0.005 |
| Microbending loss 1550 nm (dB/km) | 0.030 | 0.040 | 0.045 | 0.025 | 0.028 | 0.030 | 0.030 | 0.035 | 0.042 |

As can be seen in the example fibers of Table 1 above, exemplary fiber embodiments employ a central glass core region having index $\Delta_1$, a first inner cladding region having index $\Delta_2$, and an outer cladding region having index $\Delta_3$; wherein $\Delta_1 > \Delta_3 > \Delta_2$, wherein the difference between $\Delta_3$ and $\Delta_2$ is greater than or equal to 0.02% Δ and an absolute value of profile volume, $|V_2|$ is at least 30% micron$^2$. These exemplary fiber embodiments exhibit a cable cutoff less than or equal to 1260 nm and a bend loss of less than or equal to 0.08 dB/turn when wound upon on a 20 mm diameter mandrel. These exemplary fiber embodiments also exhibit a mode field diameter between about 8.2 and 9.1 microns, more preferably between 8.3 and 8.9 microns at 1310 nm, a zero dispersion wavelength between 1300 and 1324 nm, a dispersion slope at 1310 nm which is less than or equal to 0.092 ps/nm²/km). Many of these fibers also exhibit a bend loss at 1550 nm, when wound upon a 15 mm diameter mandrel, of less than 0.3 dB/turn, and in some cases less than 0.2 or 0.1 dB/turn. These fibers also exhibit a bend loss at 1550 nm, when wound upon on a 20 mm diameter mandrel, of less than 0.010 dB/turn, more preferably less than 0.008 dB/turn, and some fibers most preferably less than 0.006 dB/turn. These fibers also exhibit a bend loss at 1550 nm, when wound upon on a 30 mm diameter mandrel, of less than 0.010 dB/turn, and some fibers more preferably less than 0.003 dB/turn. Some of these examples employ chlorine in the outer cladding region in an amount greater than 1200 ppm, for example between 1200 ppm and 12000 ppm. Some of these examples employ chlorine in the outer cladding region in an amount greater than or equal to 1400 ppm. Some of these examples employ chlorine in the outer cladding region in an amount greater than 1400 ppm and less than 3000 ppm. Some of these examples employ chlorine in the outer cladding region in an amount greater than 2000 ppm, and in some cases greater than 3000 or even greater than 4000 ppm by weight. In some embodiments the outer cladding region comprises chlorine in an amount greater than 2000 and less than 12000 ppm by weight.

Attenuation at 1550 nm is preferably less than 0.20 dB/km, more preferably less than 0.195 dB/km, even more preferably less than 0.190 dB/km. In some preferred embodiments the attenuation at 1550 nm is less than 0.189 dB/km, even more preferably less than or equal to 0.186 dB/km, even more preferably less than or equal to 0.184 dB/km, and most preferably less than or equal to 0.182 dB/km.

It is to be understood that the foregoing description is exemplary only and is intended to provide an overview for the understanding of the nature and character of the fibers which are defined by the claims. The accompanying drawings are included to provide a further understanding of the preferred embodiments and are incorporated and constitute part of this specification. The drawings illustrate various features and embodiments which, together with their description, serve to explain the principals and operation. It will become apparent to those skilled in the art that various modifications to the preferred embodiments as described herein can be made without departing from the spirit or scope of the appended claims.

What is claimed is:

1. An optical fiber comprising:
   a central core region having outer radius $r_1$, a maximum refractive index $\Delta_1$ and core alpha parameter $\alpha$, wherein $\alpha$ is less than 10
   a cladding region comprising a first inner cladding region having an outer radius $r_2 > 17$ microns and refractive index $\Delta_2$ and a second outer cladding region surrounding the inner cladding region and comprising refractive index $\Delta_3$, wherein $\Delta_3$ is greater than 0.0%, $\Delta_1 > \Delta_3 > \Delta_2$, wherein the difference between $\Delta_3$ and $\Delta_2$ is greater than 0.02% $\Delta$, the fiber exhibits a profile volume, $V_2$ of the inner cladding region, calculated between $r_1$ and $r_2$, which is equal to:

$$V_2 = 2 \int_{r1}^{r2} \Delta_{(3-2)}(r) r \, dr$$

and $|V_2|$ is at least 30% $\Delta$micron².

2. The optical fiber of claim 1, wherein said fiber further exhibits a MAC number less than 7.5.
3. The optical fiber of claim 1, wherein the difference between $\Delta_3$ and $\Delta_2$ is greater than 0.05%.
4. The optical fiber of claim 3, wherein the first inner cladding region is substantially free of fluorine.
5. The optical fiber of claim 1, said fiber further exhibiting a bend loss when wound around a 15 mm diameter drum at 1550 nm of less than 0.4 dB/turn.
6. The optical fiber of claim 1, said fiber further exhibiting a bend loss when wound around a 20 mm diameter drum at 1550 nm of less than or equal to 0.08 dB/turn.
7. The optical fiber of claim 4, wherein the chlorine concentration in the second outer cladding region is higher than 2000 ppm.
8. The optical fiber of claim 7, wherein said fiber exhibits a 22m cable cutoff less than or equal to 1260 nm, and a mode field diameter at 1310 nm which is less than about 9.1.
9. The optical fiber of claim 1, wherein the first inner cladding region is essentially free of fluorine, boron, and germania.
10. The optical fiber of claim 1, wherein $\Delta_3 > \Delta_2$ for a length extending from $r_2$ to a radius of at least 30 microns.
11. The fiber of claim 1, wherein said fiber exhibits an attenuation at 1550 nm which is less than or equal to 0.195 dB/km.
12. The fiber of claim 1, wherein said fiber has a zero dispersion wavelength between 1300 nm and 1324 nm.
13. The fiber of claim 12, wherein said fiber exhibits a microbend loss, as measured by wire mesh drum test, of less than 0.1 dB/km.
14. An optical fiber comprising:
    a central core region comprising a refractive index profile that is substantially super-gaussian and follows the relation % $\Delta(r) = \% \Delta_{1max} \cdot \mathrm{EXP}(-((r/a)^\gamma))$, wherein r is the radial distance from center of the fiber, a is a radial scaling parameter and $\gamma > 0$, a cladding region comprising a first inner cladding region having an outer radius $r_2 > 17$ microns and refractive index $\Delta_2$ and a second cladding region surrounding the inner cladding region and comprising refractive index $\Delta_3$, wherein $\Delta_3$ is greater than 0.0%, $\Delta_1 > \Delta_3 > \Delta_2$ wherein the difference between $\Delta_3$ and $\Delta_2$ is greater than 0.02%, the fiber exhibits a profile volume, $V_2$ of the inner cladding region, calculated between $r_1$ and $r_2$, which is equal to:

$$V_2 = 2 \int_{r1}^{r2} \Delta_{(3-2)}(r) r \, dr$$

and $|V_2|$ is at least 5 30% $\Delta$micron².

15. The optical fiber of claim 14, wherein the inner cladding region is at least substantially free of fluorine and boron.
16. The optical fiber of claim 14, wherein said fiber exhibits a 22m cable cutoff less than or equal to 1260 nm, and a mode field diameter at 1310 nm which is less than about 9.1.
17. The optical fiber of claim 14, said fiber further exhibiting a bend loss when wound around a 15 mm diameter drum at 1550 nm of less than 0.4 dB/turn.
18. The optical fiber of claim 14, wherein said fiber exhibits a microbend loss, as measured by wire mesh drum test, of less than 0.1 dB/km.
19. The optical fiber of claim 1, wherein the core of said fiber exhibits a core alpha less than 5.

* * * * *